Figure 1:
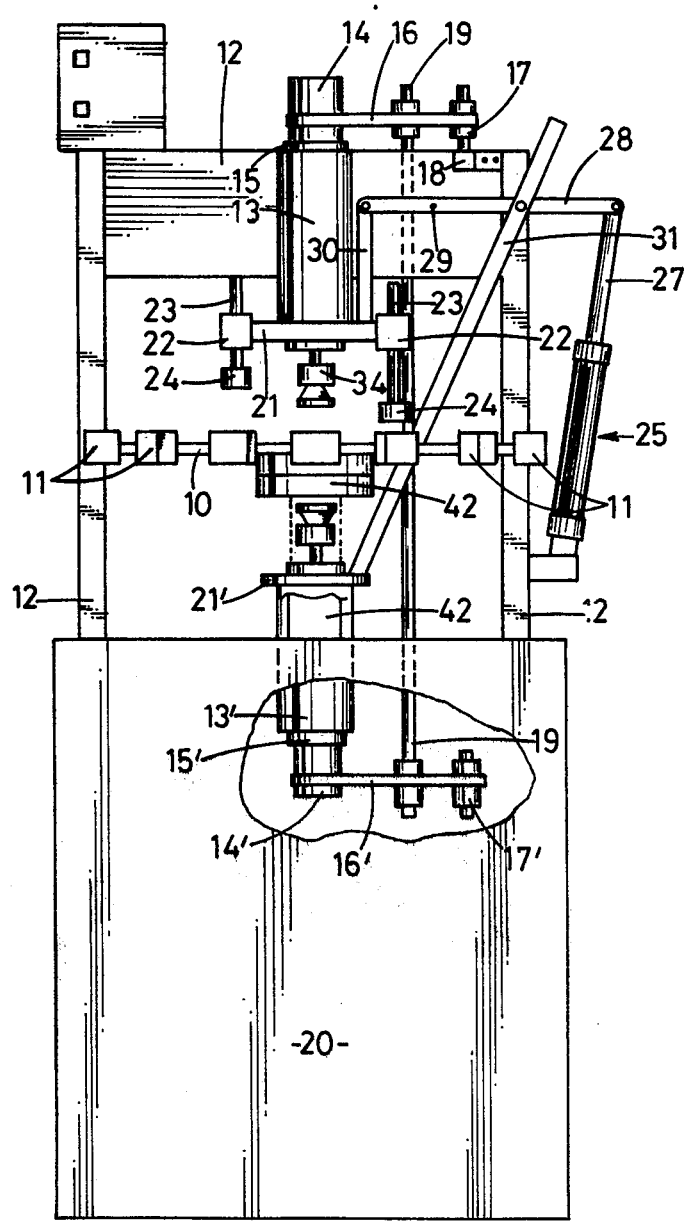

United States Patent [19]

Janssen

[11] 4,108,565
[45] Aug. 22, 1978

[54] POTATO PROCESSING

[76] Inventor: Jacobus Wilhelmus Janssen, 3 Lincoln St., Brooklyn, Wellington, New Zealand

[21] Appl. No.: 817,918

[22] Filed: Jul. 21, 1977

[51] Int. Cl.² .................. B23B 39/22; B23G 1/20
[52] U.S. Cl. .................................. 408/37; 83/404; 99/593
[58] Field of Search .............. 408/37, 40, 41; 99/539, 99/542, 544, 567, 568, 574, 575, 580, 581, 585, 588, 590, 591, 593; 83/404

[56] References Cited
U.S. PATENT DOCUMENTS

| 3,519,050 | 7/1970 | Dobrinen | 408/37 |
| 3,638,696 | 1/1972 | Loveland | 99/593 X |

Primary Examiner—Travis S. McGehee
Attorney, Agent, or Firm—Young & Thompson

[57] ABSTRACT

A potato processing apparatus which comprises a rotatable potato receiving means having a number of receptacles into which potatoes to be processed are rotated. At least one potato processing station is provided adjacent the receiving means and has potato compressing, cutting and removing means. Rotation of the receiving means is synchronized with operation of the processing station or stations such that with a potato rotated on a receptacle the compressing means operate to firmly lodge said potato within the receptacle following which the cutting means are engaged with the potato so as to cut it into a substantially spherical shape. The removing means then operate to remove the substantially spherical shaped potato from the receptacle. There is also provided potato handling apparatus which cooperates with the processing station or stations to lodge potatoes in successive receptacles as they enter the respective processing station.

13 Claims, 8 Drawing Figures

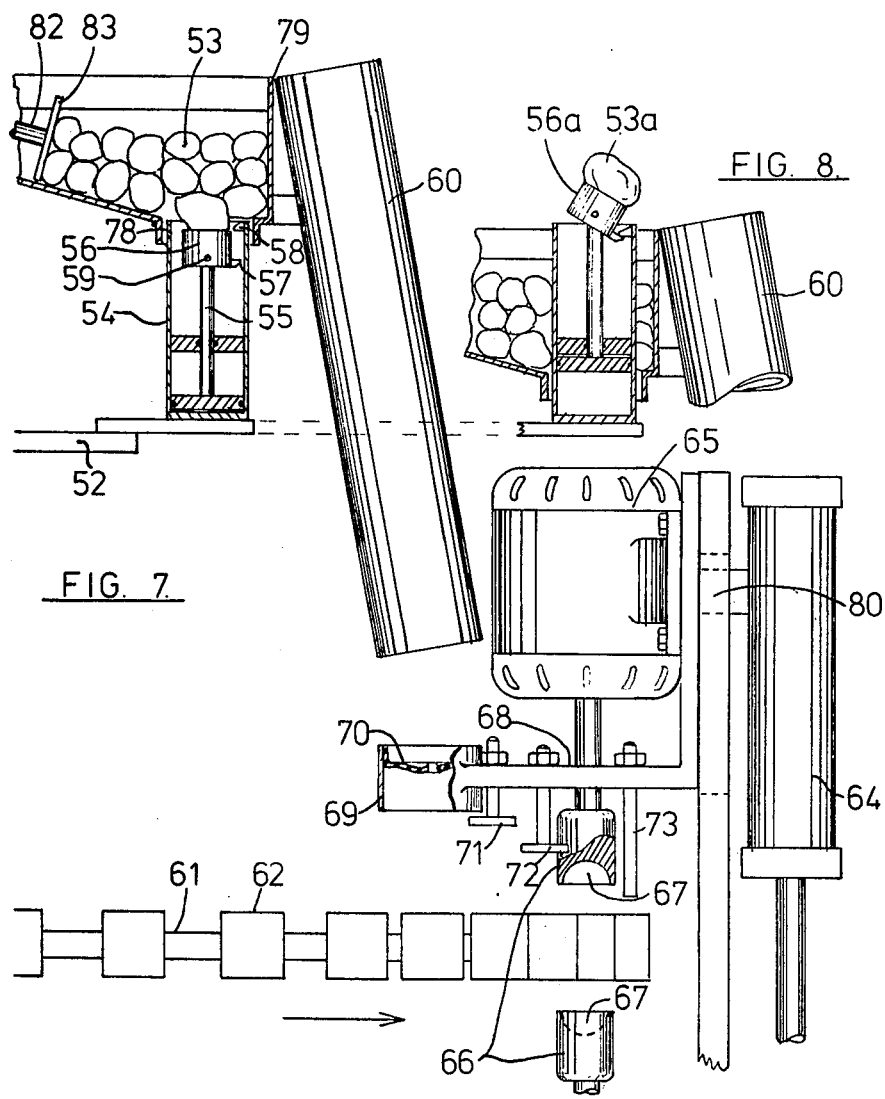

POTATO PROCESSING

This invention relates to improvements in and relating to potato processing and also to the handling of potatoes prior to their processing.

The invention is primarily concerned with a potato processing apparatus which processes potatoes, even those potatoes which may be sub-standard as far as size is concerned and which may previously have been utilized for pig food, such that the processed potato is of a substantially spherical shape. A potato so processed has a pleasing appearance when it has been cooked and served for consumption. Potatoes shaped in this way are in common use for example, in meals served on International Airlines.

At the present time the potatoes are shaped manually which is time consuming, costly and results in a non-uniform end product. There is also known an apparatus for reducing the potatoes to size and shaping but this can only operate with the operator physically holding onto the potato during processing. This of course presents a considerable danger to the operator's hands, but in addition the process is once more time consuming and costly. This type of apparatus has also suffered from problems associated with the cutting and shaping tool with the result that the processed potato can be undersize and of an irregular shape.

The aim of the present invention is to provide a potato processing apparatus which is adapted so as to enable potatoes of any suitable size to be cut into substantially spherical shape without the operator having to hold the potato during the processing operation.

Broadly in one aspect the invention consists of a potato processing apparatus comprising a rotatable potato receiving means having a number of receptacles, a potato processing station provided adjacent said receiving means, said station having potato compressing, cutting and removing means, the rotation of said receiving means being synchronized with operation of the processing station such that with a potato located on a receptacle the compressing means operating to firmly lodge said potato within said receptacle and said cutting means then being engageable with said potato so as to cut it into a substantially spherical shape and said removing means then being able to cause said substantially spherical potato to be removed from said potato receiving means.

Figure 4:
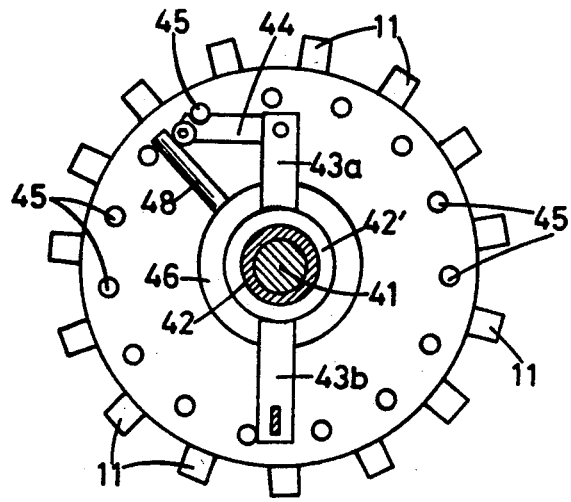
Figures 2, 3:
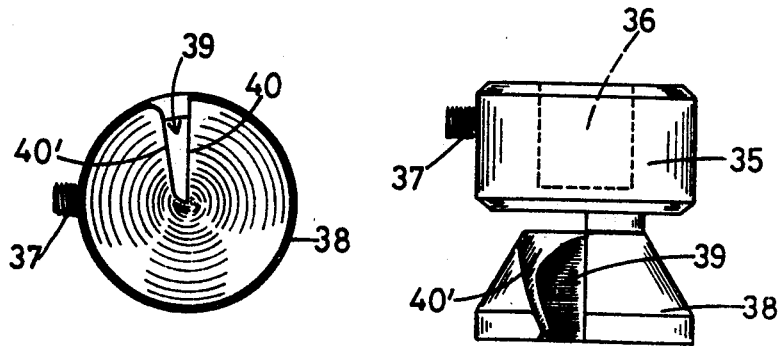
Figure 5:
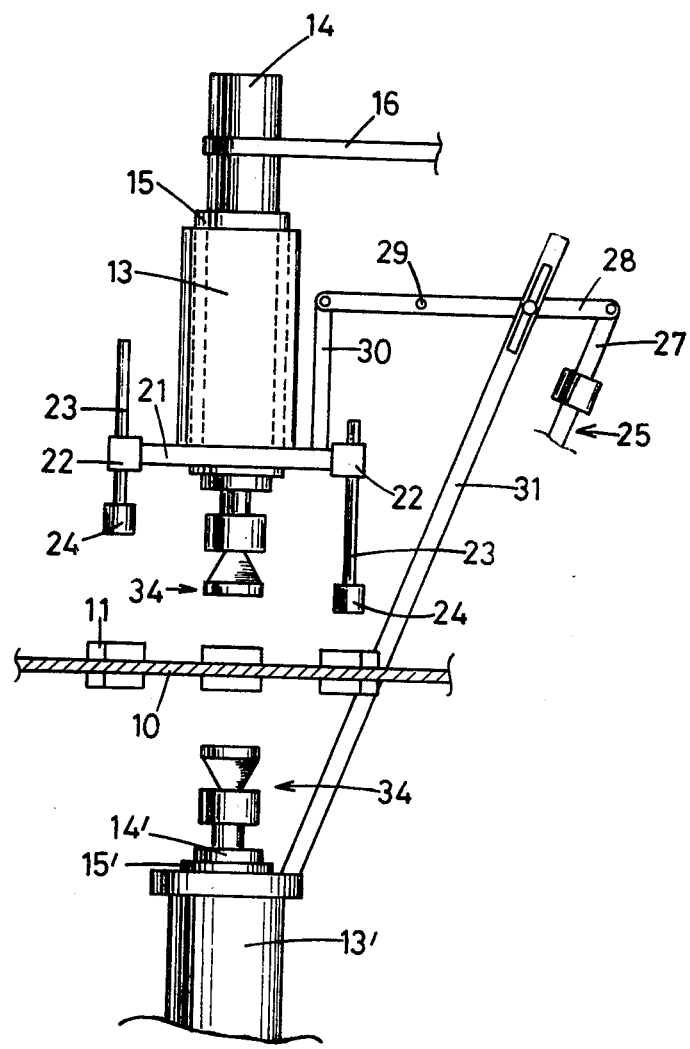
Figure 6:
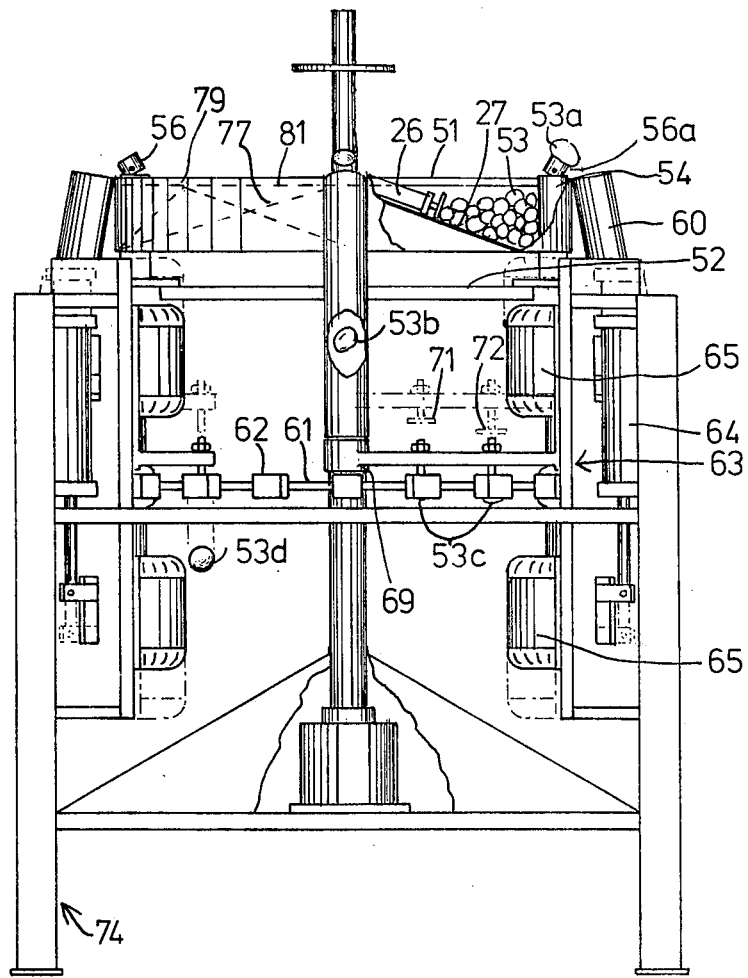

In the following description of preferred embodiments of the invention reference will be made to the accompanying drawings in which:

FIG. 1 is a view of one form of the processing apparatus according to the invention, FIG. 2 is a detail view of one of the cutting tools of the apparatus in FIG. 1, FIG. 3 is a plan view of the tool of FIG. 2, FIG. 4 is an underside view of the potato receiving means, FIG. 5 is a largely schematic representation of the processing station, FIG. 6 is a partial cross-section view of a second form of the processing apparatus according to the invention, FIG. 7 is a partial cross-section view of part of the apparatus of FIG. 6 and FIG. 8 is a partial cross-section view of the processing station of the apparatus of FIGS. 6 and 7.

Referring to FIG. 1 of the drawings a circular table 10 is mounted for rotation about a vertical axis. The table 10 has a number of receptacles 11 fastened to its periphery and these are in the form of vertically disposed short lengths of square section tubing. The distance between opposing sides of the receptacles 11 is such that it is slightly greater than the diameter of the processed potato. Preferably the receptacles 11 are of stainless steel thin wall construction.

According to the preferred form shown in FIGS. 1 and 4 the processing station consists of a support frame 12 to which a tubular guide member 13 is mounted. The longitudinal axis of the guide 13 is vertically disposed and is substantially coaxial with the central axis of the receptacle 11 positioned immediately below. A shaft 14 is located in a bearing tube 15 which is in turn located for sliding movement within guide 13. Shaft 14 is free to rotate within bearing tube 15 and as shown projects from the top thereof. A belt 16 engages with the projecting portion of shaft 14.

A similar guide 13', shaft 14' and bearing tube 15' is provided in a directly opposing position to guide 13, shaft 14 and tube 15 but on the underside of table 10. Shafts 14 and 14' are coaxial and either side of the same receptacle 11. A belt 16' engages with shaft 15' and this belt together with belt 16 extends about respective idler shafts 17 and 17', supported in bearings 18 on frame 12, and a single main drive shaft 19. An electric motor (not shown), located within housing 20 is coupled to and rotates drive shaft 19 whereby shafts 14 and 14' are driven.

As mentioned above bearing tubes 15 and 15' slide within guides 13 and 13' respectively. The lower end of tube 15 has a clamp 21 engaged thereon which carries a pair of spaced apart fixtures 22. These fixtures 22 are located either side of shaft 14 but not necessarily in a diametrically opposing relationship. Each fixture 22 has an opening into which a rod 23 is located. A locking member, such as a set screw (not shown), is provided to lock each rod 23 in a predetermined position in fixture 22. The longitudinal axis of each rod 23 is coaxial with the central axis of the receptacle located immediately below. Each rod 23 has an enlarged end 24 which has a diameter less than the distance between the inside wall surfaces of the receptacles 11. The rod 23 and enlarged end 24 could thus be described as a plunger 23,24 which is adjustable in its vertical position by sliding rod 23 within fixture 22 and locking at a predetermined setting for reasons which will hereinafter become apparent.

As mentioned previously shafts 14 and 14' slide within their respective guides 13 and 13' with the sliding movement being controlled by any suitable means. FIGS. 1 and 4 show one example of such control means. A pneumatic (or hydraulic) ram 25 provides the motive force with the cylinder 26 thereof being pivotally mounted by one end to frame 12. The free end of the piston rod 27 is coupled to an arm 28 which is pivotally mounted at 29 to frame 12. The pivot point 29 is inward of the end of the arm 28 remote from piston rod 27. This remote end is pivotally attached to a lever arm 30 which is in turn coupled to bearing tube 15 conveniently by attachment to clamp 21.

A second lever arm 31 is coupled to arm 28 and the point of attachment is between pivot point 29 and the point of attachment of piston rod 27. This second lever arm 31 is attached to bearing tube 15' by for example a clamp 21' similar to clamp 21 on tube 15. To allow for adjustment arm 31 has an elongate longitudinal slot 32 therein so that the position of arm 31 with respect to arm 28 can be altered.

The ram 25 is double acting for positive action and is provided with normal ancillary equipment such as a control mechanism, pump etc. Such an arrangement is well known to those skilled in the art and requires no further detailed description for the purposes of describing the invention. It is sufficient to say that the control mechanism or switches are synchronised to the action of the table 10 as will hereinafter be described.

A cutting tool 34, as more fully illustrated in FIGS. 2 and 3, is attached to a suitable mounting on each of shafts 14 and 14'. In the form shown each cutting tool 34 has a substantially cylindrical body 35 with an axial opening 36 in the upper surface. A set screw 37 locks the body 35 onto a suitable spigot or the like on the end of shaft 14 or 14'. The cutting portion 38 of the tool is substantially conical shaped with a half spherical internal shape. The diameter of the internal shape is substantially equal to the size required for the shaped potato.

A slot 39 is cut into the wall of the cutting portion 38 the leading edge 40 of which is approximately radial whilst the trailing edge 41 curves backwardly from the outer edge of portion 38 (see FIG. 3). The slot 39 is so formed and takes up a relatively small area of the half spherical surface so that the cut portions of the potato being processed can readily exit from the tool whilst at the same time ensuring the slot does not dig into the potato such as to impair the surface finish or overall shape of the potato. It will be appreciated that the tool can be readily removed for servicing or replacement.

An indexing arrangement (see FIG. 4) is provided for positive movement of table 10 to ensure that the table moves intermittently with a new receptacle 11 being positioned under plungers 23,24 and between tool 34 with each movement of the table. Table 10 is mounted on a vertical axle 41 which is enclosed within a coaxial tube 42. A collar 42' is attached to tube 42 and sandwiches between itself and the table 10 a fixed member 46 which carries a locking arm 48. The member 46 is fixed in position and does not rotate with movement of axle 41 or tube 42.

Diametrically opposed arms 43a and 43b are attached to collar 42' with arm 43b being coupled to a double acting pneumatic (or hydraulic) ram (not shown). Arm 43a is coupled to a pawl arm 44 which is biassed by a spring (not shown) to normally move away toward the periphery of table 10. A series of lugs or spigots 45 are positioned around the underside of table 10 as shown.

The free end of pawl arm 44 carries a downwardly directed projection 47 which extends to the level of lock arm 48. It will therefore be appreciated that arm 48 lies below pawl arm 44 and arm 43a.

In describing the operation of the apparatus it will be assumed an unprocessed potato is placed on the receptacle 11 immediately preceding that receptacle position beneath the first plunger 23,24 (the table being rotated in the direction of the arrow). The shafts 14 and 14' are driven continuously and with ram 25 in the position shown the ram coupled to arm 43b is activated to cause tube 42 to rotate sufficiently for pawl arm 44 by engaging with a lug 45 to move the receptacle 11 with potato on to move below first plunger 23,24. The table now reaches the position in FIG. 4 where projection 47 engages against fixed locking arm 48 so that the table is fixedly locked against movement as pawl arm 44 cannot disengage from lug 45 and tube 42 cannot rotate because of the ram being at the end of its throw. Ram 25 is then actuated to move bearing tubes 15 and 15' from guides 13 and 13'. The first plunger 23,24 thus pushes the potato into the receptacle thereby cutting the sides from said potato.

The table 10 is then indexed, by the indexing ram being activated and so drawing pawl arm 44 back away from lug 45 and into engagement (by the spring biass of arm 44) with the following lug. The indexing ram then moves in the opposite direction to make pawl arm 44 once again take the position of FIG. 4 (but with the lug 45 just engaged) and so bring receptacle 11 under tool 34. The tools are then brought in toward one another and so cut the potato to shape. It will be appreciated that the throw of bearing tubes 15 and 15' are such that tools 34 whilst coming very close to one another do not make contact. At the same time the potato is being cut a potato is being compressed into the following receptacle.

As the cutting tools 34 do not meet the shaped potato remains in the receptacle but once the table is again indexed the second plunger 23,24 (when ram 25 is actuated) pushes the potato from the receptacle 11 and into a chute 46 (shown in dotted detail) for delivery to a container.

With the aforementioned embodiment of the invention the unprocessed potatoes are manually placed on the receptacles and whilst this does not involve the operator placing his or her hands anywhere near the cutting tools it does involve the continual attention of one member of the workforce. Accordingly, an apparatus for potato handling can be used to automatically select a potato from a heap such as in a hopper and place this onto a receptacle. Such handling apparatus is described in the following with the associated processing apparatus being of a different embodiment to that previously described.

Referring to FIGS. 6, 7 and 8 a tray 51 has an upstanding peripheral rim 79 and a base formed with a plurality of substantially flattened "V" cross-section chutes such that potatoes 53 poured into tray 51 collect together in the respective chutes. In the embodiment shown in FIG. 6 the potato processing apparatus is provided with four chutes from the handling apparatus and a corresponding number of potato processing stations. The potato handling apparatus, which will be described in detail with respect to FIG. 7 feeds potatoes 53A into a downwardly inclined chute or tube 60, see potato referenced 53B, the potato falling into a receptacle 62 of the type described in the first embodiment. A holding ring 69 with downwardly inclined substantially resilient flaps 70 prevents the potato after it has dropped into receptacle 62 from jumping out again. The holding ring 69 is mounted on an arm 68 together with plungers 71,72 and 73, cutting tool 66 and motor drive 65. Arm 68 is connected with a slide mechanism 80 which in turn is connected with a ram 64 such that the arm and associated processing components can be moved in a vertical plane towards or away from the receptacles 62 which are spaced apart about the periphery of a rotatable table 61. As with the first embodiment rotation of the table 61 is controlled so that it is indexed to move one receptacle space at a time. Thus the potato referenced 53B when in receptacle 62 will be held in position by the holding ring 69 which has positioned itself over the receptacle 62 with the controlled downward movement of the arm 68. The arm 68 now rises and the receptacle containing the potato moves to the next position under the plunger 71. Unlike the first embodiment two plungers 71 and 72 are provided so that the potato is pressed in receptacle 62 in two stages rather than in one movement of a single plunger. As with the first embodiment arm 68 reciprocates up and down as table 61 indexes whereby the potato is first shaped by tools 67 and then pushed from receptacle 62 by plunger 73. It will be appreciated that as with the first embodiment this description has related to the processing of a single potato as it moves under the different processing components but it will be understood that at any one time a potato is contained in a receptacle underneath each of the tools such that every movement of the table 61 results in a processed potato being dislodged from its receptacle 62 at each station of the apparatus.

Referring now more particularly to FIGS. 7 and 8 it is seen that potatoes 53 are positioned in one of the chutes of the tray 51 above an aperture 78 adjacent the upstanding rim 79. A cylinder 54 is connected to the frame 52 which is movable in a vertical direction towards and away from tray 51. Control of the movement of frame 52 may be effected by means of a single acting cylinder connected in a compressed air supply to an inner spring loaded cylinder which causes a single stroke thereof and a single movement of the frame 52 in an upward or downward movement thus causing the cylinder 54 to move from the position shown in FIG. 7 into its position shown in FIG. 8. It will be seen that an inner shortened cylinder 56 is mounted within the cylinder 54 and is movable therewithin by means of its connection to a piston linkage 55 by means for example of the pin 59 as shown. A compressed air supply (not shown) to the bottom of the cylinder 54 controls the upward or downward movement of the piston rod 55. Thus the inner cylinder 56 which functions as a potato holder, is shown provided with an outwardly directed projection 57 which, when the cylinder 56 reaches or approaches the upper end of the cylinder 54 engages with a corresponding inwardly directed lip or projection 58 provided on the inner surface of cylinder 54. Cylinder 56 is pivoted about piston rod 55 into the position shown in FIG. 8 and referenced 56A, the potato now referenced 53A being in FIG. 8 about to be discharged from the cylinder 56A into the downwardly directed tube 60, and thus into a receptacle 62 which positioned, together with the holding ring 69, below the lower end of the tube 60. In order to prevent the build-up of a wall of potatoes about the aperture 78 a reciprocating ram rod 82 with a ram 83 connected thereto is operated by means for example of the aforementioned hydraulic system so as to agitate the potatoes 53 and substantially prevent such a wall being formed. The potato processing apparatus including the potato handling apparatus as shown in FIG. 6, is preferably provided with a suitable support frame (shown generally by arrow 74). As this apparatus is dealing with a food product and the fact that the potatoes may also be in a damp condition when placed into the tray 51, it is preferable that the materials used for the apparatus are of a non-corrodable type and may be of for example, stainless steel or other metal, plastics or the like.

In one further embodiment it is envisaged that a hopper would be provided having a screen therein dividing the hopper into two compartments such that potatoes fed down one compartment would locate themselves around the upper end of the cylinder or the like 54 of a potato handling apparatus, the movement thereof thus lifting one potato in the potato holder cylinder 56 upwardly through the second compartment and such that pivoting of the potato holder cylinder 56 would then release the potato through a suitable outlet.

It will also be appreciated that handling apparatus as shown in FIGS. 6, 7 and 8 can be used in conjunction with a number of processing apparatus of the first embodiment with a tray of each processing apparatus being located beneath a chute of the handling apparatus. Alternatively, the handling apparatus can be modified to include only one outlet chute which would be positioned above the tray of a single processing apparatus.

Although this invention has been described by way of example and with reference to preferred embodiments of the invention it is to be understood that modifications and improvements may be made thereto without departing from the scope or spirit of the invention.

What is claimed is:

1. A potato processing apparatus comprising a rotatable potato receiving means having a number of receptacles, a potato processing station provided adajcent said receiving means, said station having potato compressing, cutting and removing means, the rotation of said receiving means being synchronised with operation of the processing station such that with a potato located on a receptacle the compressing means operating to firmly lodge said potato within said receptacle and said cutting means then being engageable with said potato so as to cut it into a substantially spherical shape and said removing means then being able to cause said substantially spherical potato to be removed from said potato receiving means.

2. Apparatus as claimed in claim 1 wherein said receiving means and receptacles are a circular table mounted for rotation about a vertical axis with a plurality of square section tubes mounted at the periphery thereof the longitudinal axis of which are parallel to the axis of rotation of the table.

3. Apparatus as claimed in claim 2 wherein said cutting means consists of at least one cutting tool mounted for rotation about a vertical axis disposed above a said receptacle, said tool having a concave substantially circular cross section surface with a cutting edge associated therewith.

4. Apparatus as claimed in claim 3 wherein said cutting edge is formed by a slot cut into said concave surface and extending from the outer peripheral edge thereof, the leading edge of the slot being substantially radial and the trailing edge curving slightly backward from said peripheral edge.

5. Apparatus as claimed in claim 4 wherein two cutting tools are provided one either side of the receptacle, said tools being mounted for linear movement toward and away from said receptacle.

6. Apparatus as claimed in claim 3 wherein the compressing and removing means each consist of a plunger located either side of the or one of said cutting tools and above a receptacle, the plungers being mounted for linear movement to and from said receptacle.

7. Apparatus as claimed in claim 6 wherein indexing means are provided to move the receiving means one receptacle space at a time passed the processing station.

8. Apparatus as claimed in claim 7 wherein the indexing means is a reciprocating arm driven by a fluid driven linear actuator said arm being successively engageable with drive projections located on the underside of the table.

9. Apparatus as claimed in claim 3 wherein more than one processing station is located adjacent the potato receiving means.

10. Apparatus as claimed in claim 3 in combination with potato handling apparatus comprising a hollow member and a potato holder mounted in and movable within said hollow member, a tipping means provided for said potato holder such that when said potato holder is tipped about the longitudinal axis of said hollow member and whereby a potato held in said potato holder can be tipped from said holder into an outlet which may be provided adjacent said upper end of said hollow member, there being a chute positioned adjacent the hollow member outlet, the delivery chute extending to terminate adjacent the potato receiving means.

11. Apparatus as claimed in claim 10 wherein the hollow member is a cylindrical tube, the potato holder being a tube shorter in length and of less diameter than side hollow member the holder being movable along the longitudinal axis of said hollow member but on reaching or approaching the upper open end thereof pivots about said opening to cause release of a potato held therein.

12. Apparatus as claimed in claim 11 wherein the potato handling apparatus is positioned below an aperture in a tray, said tray having a peripheral rim or raised edge from which extends a substantially flattened V shaped chute inclined down toward the said aperture.

13. Apparatus as claimed in claim 12 wherein the tray includes a number of said V shaped chutes each of which extends to the aperture of a potato handling apparatus, there being a separate delivery chute for each handling apparatus, the delivery chutes extending to the potato receiving means adjacent a potato processing station.

* * * * *